United States Patent [19]

Orsborn

[11] Patent Number: 4,914,897

[45] Date of Patent: Apr. 10, 1990

[54] NARROW ROW COTTON HARVESTER

[75] Inventor: Jesse H. Orsborn, Hinsdale, Ill.

[73] Assignee: J.I. Case Company, Racine, Wis.

[21] Appl. No.: 297,183

[22] Filed: Jan. 13, 1989

[51] Int. Cl.[4] ............................................. A01D 45/18
[52] U.S. Cl. ........................................... 56/13.2; 56/28
[58] Field of Search ..................... 56/12.4, 12.5, 13.2, 56/14.2, 14.3, 28, 30, 39, 40, 41, 44, 45, 105

[56] References Cited

U.S. PATENT DOCUMENTS

| Re. 32,699 | 6/1988 | Fachini | 56/44 |
|---|---|---|---|
| 3,650,096 | 3/1972 | Caldwell | 56/7 |
| 4,249,365 | 2/1981 | Hubbard et al. | 56/13.2 |
| 4,637,625 | 1/1987 | Blackwell | 56/7 X |
| 4,722,173 | 2/1988 | Covington et al. | 56/15.9 |

Primary Examiner—William P. Neuder
Attorney, Agent, or Firm—Dressler, Goldsmith, Shore, Sutker & Milnamow, Ltd.

[57] ABSTRACT

A cotton harvester machine having a plurality of cotton harvesting units and a system for mounting the harvesting units at a front end of the cotton harvester. The harvesting units are connected to a frame of the cotton harvester machine in a manner allowing vertical displacement of the harvesting units with respect to the frame. The mounting system arranges the harvesting units forwardly of the frame at different distances in a manner improving weight distribution for the machine while facilitating narrow row cotton harvesting.

16 Claims, 2 Drawing Sheets

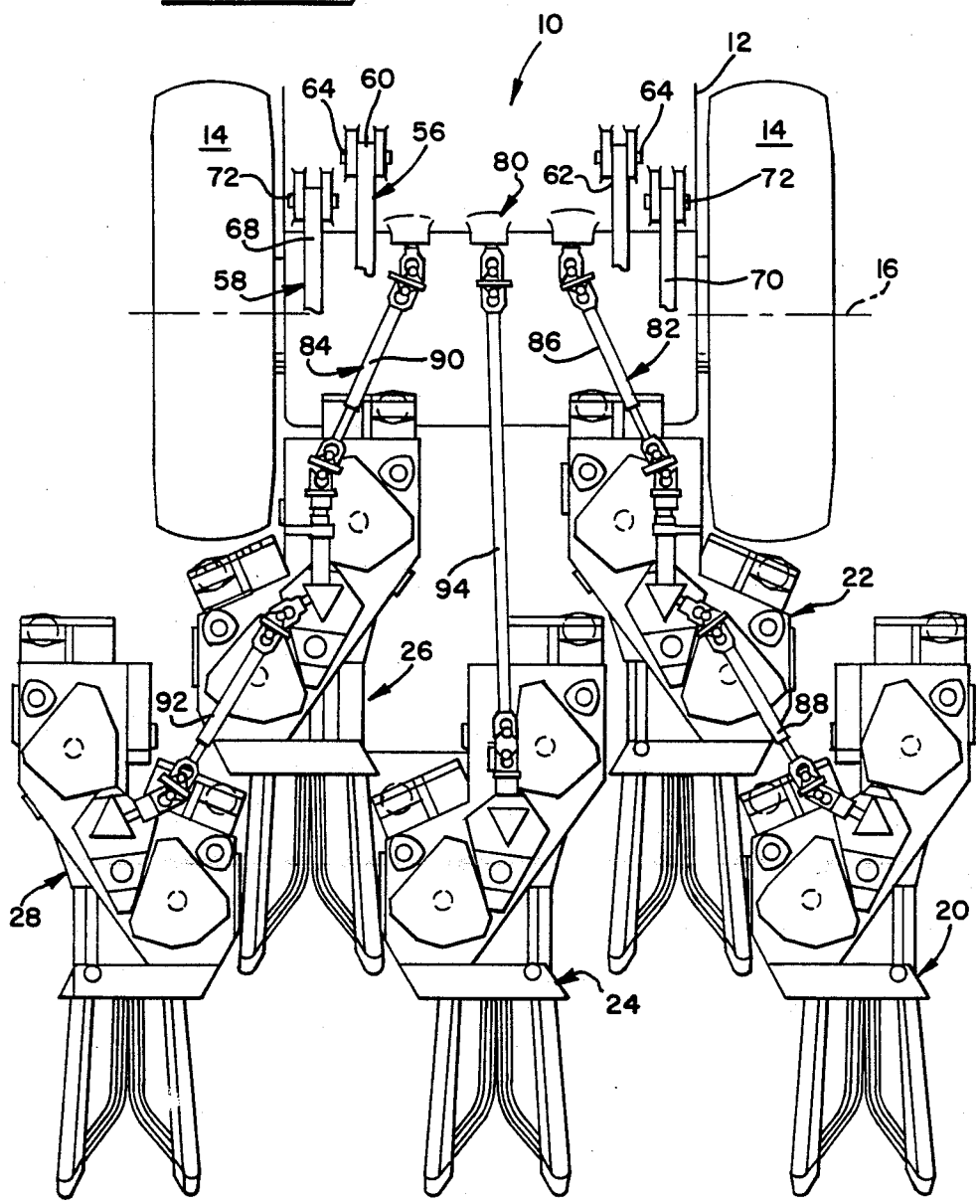

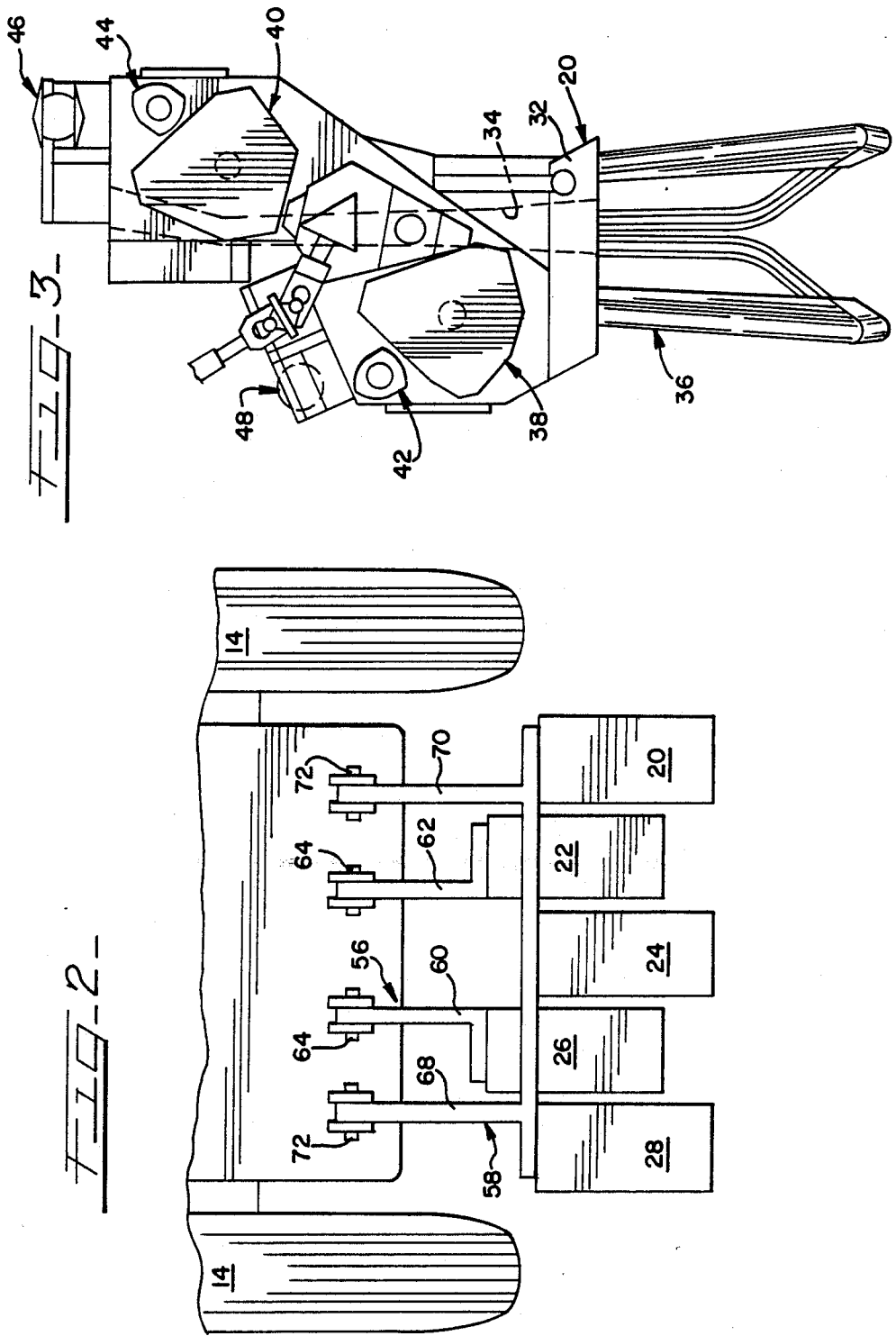

NARROW ROW COTTON HARVESTER

FIELD OF THE INVENTION

This invention generally relates to cotton harvesting machines and, more particularly, to a system for mounting and supporting at least two harvesting units on a cotton harvesting machine for harvesting adjacent rows of cotton wherein the rows are spaced less than 40 inches apart.

BACKGROUND OF THE INVENTION

Conventional self-propelled cotton harvesters include a frame mounted on a front pair of drive wheels. A pair of steerable rear wheels provide the harvester with proper direction. Mounted in a cantilevered fashion to the front or forward end of the cotton harvester are two or more harvesting units.

Each harvesting unit typically includes a housing which encloses two rotatably driven picker rotors, a doffer assembly, and a picker spindle moistening assembly. Each picker rotor has numerous circularly driven picker bars provided thereon. Each picker bar mounts a plurality of rotatably driven, radially extending picker spindles for removing cotton from a plant. The doffer assembly includes a column of doffer pads which are positioned to remove the cotton from the picker spindles. Similarly, the moistener assembly includes a column of moistening pads arranged to add moistening fluid to the cotton picker spindles before they are introduced to the cotton plants.

Although considerable design effort has resulted in reducing both the size and weight of the harvesting units, the purpose and required operation of such unit dictates a relatively large size mechanism of considerable weight.

As will be readily understood, mounting of two or more such units toward the front end of the frame of the cotton harvesting machine shifts the center of gravity away from the rear wheels toward the front end of the machine. To allow the rear steering wheels of the cotton harvester to remain in contact with the surface over which the machine is driven, it is known to add weights or ballast toward the rear end of the machine in a manner counterbalancing the weight of the harvesting units at the front end of the cotton harvester.

As additional harvesting units are added to the front end of the machine to increase productivity, the center of gravity and overall load distribution of the machine shifts closer to the front wheels. As such, the front axle weight is increased significantly. As will be apparent, such additional weight on the front axle requires additional weights or ballast to offset or counteract the weight distribution of the machine. Such additional weight, however, adds structural problems to the frame. Front tire problems also increase. Furthermore, the mobility of the harvesting unit is severely restricted in soft or muddy fields Each cotton harvesting unit defines a plant passage through which the cotton plant passes during cotton harvesting. To enhance "nesting" of the harvesting units relative to each other, the two picker rotors of each harvesting unit are preferably disposed on opposite sides of the plant passage When a forward picker rotor of the harvesting unit is disposed to the left side of the plant passage, as viewed from the front of the machine, the harvesting unit is generally categorized as being "left handed". When a forward picker rotor of the harvesting unit is disposed to the right side of the plant passage, as viewed from the front of the machine, the harvesting unit is generally categorized as being "right handed".

Older cotton harvesting machines commonly have one or more left handed harvesting units arranged in axial alignment with one or more right handed harvesting units. To effect narrow cotton row harvesting, and as may be appreciated, such harvesting units are disposed closely adjacent one another in a side-by-side relationship. The close proximity of the harvesting units relative to each other hampers accessibility to the component structure of each harvesting unit. To outfit these older machines with newer harvesting units, to facilitate nesting of such units, is an expensive conversion option.

SUMMARY OF THE INVENTION

In view of the above, and in accordance with the present invention, there is provided a cotton harvester including at least two harvesting units which are mounted on a mobile frame of the machine to effect narrow row cotton harvesting. The harvesting units are supported at a forward end of the cotton harvester in a staggered relationship relative to one another such that one harvesting unit extends forwardly from the machine frame a greater distance than does the other harvesting unit. The staggered relationship of the harvesting units improves the weight distribution of the cotton harvester and increases the nesting capability of the harvesting units in a manner facilitating narrow row cotton harvesting.

More specifically, the narrow cotton harvester of the present invention includes a main frame supported for movement across a cotton field on a front pair of wheels adapted for rotation about a common axis. The cotton harvester includes at least two harvesting units supported at a forward end of the main frame. Each harvesting unit defines a plant passage for receiving one of a series of adjacent and substantially parallel rows of cotton. The harvesting units are supported forwardly of the frame at different distances from the common axis of the wheels.

As may well be appreciated, the productivity of the cotton harvesting machine is increased as a function of the number of individual harvesting units connected to the forward end of the cotton harvester. The cotton harvester machine preferably includes three or more laterally spaced harvesting units supported at a forward end of the frame for harvesting at least three adjacent rows of cotton. In a preferred embodiment, each harvesting unit has forward and rearward picker rotors disposed on opposite sides of a plant passage extending through each harvesting unit. In a machine having at least three harvesting units, two of the harvesting units are supported on the frame at a first forward distance from the common axis of the wheels and the third harvesting unit is mounted on the frame at a second forward distance from the common axis of the wheels.

The harvesting units are connected to the frame by a support mechanism. The support mechanism includes independent lift arms pivotally connected to the frame for allowing independent relative vertical movement of the harvesting units with respect to the frame. More specifically, a first lift arm assembly supports one or more of the harvesting units and a second lift arm assembly supports the remaining harvesting units forwardly of the frame of the harvesting machine.

A balanced drive system is preferably employed for driving the harvesting units. Such a balanced system includes a first drive linkage for driving those harvesting units disposed to one side of the frame and a second drive linkage for driving those harvesting units disposed on an opposite side of the frame.

Supporting the harvesting units at different distances from the common axis of the wheels yields several benefits A fore-and-aft staggered mounting of the harvesting units enhances the nesting capability of the harvesting units with respect to each other to facilitate narrow row cotton harvesting. Moreover, supporting the harvesting units in a staggered fore-and-aft relationship relative to each other further enhances accessibility to component parts of the harvester units.

In contrast to previous designs having all the harvesting units arranged in line across a front end of the cotton picker, the staggered fore-and-aft mounting concept of the present invention furthermore improves the load distribution of the machine. By staggering the harvesting units in the manner taught by the present invention, the center of gravity of the machine is moved toward the center of the machine. As such, a reduction in the ballast required to offset the cantilevered harvesting unit design is effected. A reduction in the amount of ballast leads to a reduction in front axle weight, reduces tire problems resulting from the weight distribution of the harvester, and improves the overall handling of the cotton harvester machine.

Other features and advantages of the present invention will become readily apparent from the following detailed description, appended drawings, and accompanying claims.

BRIEF DESCRIPTION OF THE DRAWINGS

FIG. 1 is a partial top elevational view of a cotton harvester illustrating a preferred harvesting unit mounting arrangement; and FIG. 2 is a plan view similar to FIG. 1 schematically illustrating a mechanism for effecting the harvesting unit mounting arrangement illustrated in FIG. 1; and FIG. 3 is a simplified plan view showing the general configuration of a single harvesting unit.

DETAILED DESCRIPTION OF THE PRESENT INVENTION

While the present invention is susceptible of embodiment in various forms, there is shown in the drawings a presently preferred embodiment hereinafter described with the understanding that the present disclosure is to be considered as an exemplification of the invention, and is not intended to limit the invention to the specific embodiment illustrated.

Referring now to the drawings, there is shown a self-propelled cotton harvesting machine which is depicted only fragmentarily and is seen as represented in its entirety by reference numeral 10. Cotton harvesting machine 10 has a mobile fore-and-aft extending main frame 12 mounted on a pair of laterally spaced front wheels 14. In this particular embodiment, wheels 14 drive the cotton harvester and are mounted for rotation about a common axis 16 extending across frame 12. A pair of steerable rear wheels (not shown) provide the harvesting machine with proper direction.

Positioned forwardly of the frame 12 are a plurality of cotton picker harvesting units 20, 22, 24, 26 and 28. As illustrated, the harvesting units are arranged for harvesting several parallel and adjacent rows of cotton.

It should be appreciated, however, that this invention equally applies to a lesser number of harvesting units than that illustrated.

In a preferred form of the invention, each of the harvesting units is substantially similar in structure. Accordingly, only a description of harvesting unit 20 will be provided with the understanding that the other harvesting units are similarly structured.

Turning now to FIG. 3, each harvesting unit includes a housing assembly 32 which defines a fore-and-aft plant passage 34 for receiving one of a series of adjacent and parallel rows of cotton. Each harvesting unit is further provided with a pair of stalk lifters 36 on either side of passage 34.

Each harvesting unit is further provided with forward and rearward picker rotors 38 and 40. In the preferred embodiment, the picker rotors 38 and 40, are separated by the fore-and-aft plant passage 34. Each picker rotor moves in an orbital path and is supported for rotation about a vertical axis by housing assembly 32. Adjacent the picker rotors 38 and 40 are conventional upright doffer assemblies 42 and 44 which remove cotton from picking spindles on the picker rotors Conventional upright discharge structures 46 and 48 are provided near the doffer assemblies 42 and 44, respectively, to receive cotton bolls removed from the picker rotors 38 and 40 by the doffer assemblies 42 and 44 and direct such bolls through upright openings in the rear of the harvesting units. Cotton conveying ducts (not shown) direct the cotton from the discharge structures into a basket (not shown) on the machine.

Returning to FIG. 1, one or more harvesting units are supported forwardly of the frame at a first distance from the common axis 16 of the front pair of wheels while one or more other harvesting units are supported forwardly of the frame at a second distance from the common axis 16 of the wheels. To effect such ends, first and second lift arm assemblies 56 and 58 are used to vertically support and connect the harvesting units in a fore-and-aft staggered relationship with respect to the frame 12 of the machine 10.

As schematically illustrated in FIG. 2, lift arm assembly 56 includes a pair of spaced links or lift arms 60 and 62. One end of each of the lift arms 60, 62 is pivotally connected to the frame 12 of the machine by a transverse pivot pin 64 which extends through the lift arms. As illustrated, lift arms 60, 62 are connected at their other ends to the harvesting units 22 and 26 by suitable connecting brackets. Particularly as illustrated, harvesting units 22, 26 are connected to the frame in aligned relation relative to each other at a first distance from the common axis 16 of the front pair of wheels. It should be appreciated, however, that the lift arm assembly 56 can be used to support and connect any one or a plurality of harvesting units other than that illustrated to the frame of the cotton harvester while the other lift arm assembly supports the remainder of the harvesting units relative to the frame 12.

A hydraulic driver or cylinder (not shown) is connected between the frame of the machine 10 and each lift arm 60, 62. As will be understood, the effective length of the hydraulic cylinder controls the angular disposition of the lift arms 60, 62 and thereby the vertical position of the harvesting units connected thereto.

As schematically illustrated in FIG. 2, lift arm assembly 58 includes a pair of spaced links or lift arms 68 and 70. One end of each of the lift arms 68, 70 is pivotally connected to the frame 12 of the machine by a transverse pivot pin 72 which extends through the lift arms. As illustrated, lift arms 68 and 70 are connected at their other ends to the harvesting units 20, 24 and 28 by suitable connecting brackets. Particularly as illustrated, harvesting units 20, 24 and 28 are connected to the frame in aligned relation relative to each other at a second distance from the common axis 16 of the rotor wheels 14.

Alternatively, lift arm assembly 58 can be used to support any one or a plurality of harvesting units other than that illustrated to the frame of the cotton harvester while the other lift arm assembly supports the remainder of the harvesting units to the frame 12 or the machine 10. If so desired an additional lift arm assembly could be used to separately support and connect individual harvesting units to the frame of the cotton harvester.

A hydraulic cylinder (not shown) is connected between the frame and each of the lift arms 68 and 70. As will be understood, the effective length of the hydraulic cylinder controls the angular disposition of the lift arms 68 and 70 and thereby the harvesting units 20, 24 and 28 connected thereto.

As illustrated in FIG. 1, harvesting units 20, 22 are positioned generally to one side of the machine 10. Harvesting units 26 and 28 are positioned generally to the opposite side of the machine 10. Harvesting unit 24 is located midway between harvesting units 22 and 26 approximately in line with longitudinal axis of the machine. Particularly as illustrated, harvesting units 20 and 28 define an outer pair of harvesting units while harvesting units 22 and 26 define an inner pair of harvesting units.

A balanced drive system 80 is provided for driving the harvesting units 20 thru 28. As illustrated, drive system 80 preferably includes first and second linkage assemblies 82, 84. As illustrated, linkage assembly 82 drives the harvesting units positioned on one side of the machine 10. Linkage assembly 84 drives those harvesting units positioned on the opposite side of the harvesting machine 10.

Linkage assembly 82 includes an input drive shaft 86 extending forwardly from the frame for driving harvesting unit 22. Each harvesting unit includes a conventional gear box to which the input drive shaft for that harvesting unit is connected. Another drive shaft 88 extends from the gear box on harvesting unit 22 for driving harvesting unit 20.

Similarly, linkage assembly 84 includes an input drive shaft 90 extending forwardly from the frame 12 of the machine for driving harvesting unit 26. A second drive shaft 92 extends from the gear box on harvesting unit 26 for driving harvesting unit 28.

To maintain a balanced system, a separate input drive shaft 94 is provided for driving the harvesting unit 24 centered between the inboard and outboard harvesting units. In a preferred form, the input drive shafts 86, 90 and 94 are driven through a suitable transmission mechanism in timed relation with the rotational speed of wheels 14.

Although harvesting units 20 thru 28 may include a combination of right and left handed units, the staggered mounting arrangement of such units allows them to be arranged in a manner facilitating harvesting of narrow rows of cotton. When harvesting narrow rows of cotton, the harvesting units are mounted such that the picker rotors of one harvesting unit are nested relative to the picker rotors of an adjacent harvesting unit.

Because of the nested relationship of the harvesting units with respect to each other, a line extending generally parallel to a fore-and-aft plant passage of one of the harvesting units and tangent to the orbit of a picker rotor of that harvesting unit located between two adjacent plant passages intersects the orbit of the picker rotor of an adjacent harvesting unit located between the same two plant passages.

In the embodiment illustrated, a line extending parallel to the fore-and-aft plant passage of harvesting unit 26 and tangent with the orbit of the rear picker rotor of harvesting unit 26 intersects the orbit of the forward picker rotor of harvesting unit 24 arranged adjacent thereto. Moreover, a line extending generally parallel to the fore-and-aft plant passage of either harvesting unit 22 or 24 and tangent with the orbit of the rear picker rotor of either harvesting unit 24 or 26 intersects the orbit of the rear picker rotor of the other harvesting unit.

In addition to enhancing the nesting capability of the harvesting units to effect narrow row cotton harvesting, the staggered mounting arrangement of the present invention improves accessibility to the harvesting units. That is, the staggered relationship of these units provides an operator with greater accessibility to either the picker spindles, the doffer assemblies, or the moistening pad assemblies comprising the harvesting unit. The staggered mounting arrangement of the present invention further improves load distribution for the cotton harvesting machine 10.

By arranging the units such that some units are disposed at a first distance from the forward end of the machine and other harvesting units are disposed at a second distance from the frame of the machine, the center of gravity of the machine is shifted in an advantageous manner which requires less offsetting ballast or weight to be added to the machine. As illustrated, the staggered mounting arrangement of the present invention allows at least two harvesting units to be arranged closer to the common axis 16 of the wheels 14 and be embraced thereby. Because such units are not extended away from the frame to the extent of harvesting units 20, 24 and 28, the center of gravity of the machine is shifted in an advantageous manner.

From the foregoing, it will be observed that numerous modifications or variations can be affected without departing from the true spirit and scope of the novel concept of the present invention. It will be appreciated that the present disclosure is intended as an exemplification of the invention, and is not intended to limit the invention to he specific embodiment illustrated. The disclosure is intended to cover by the appended claims all such modifications as fall within the scope of the claims.

What is claimed is:

1. A narrow row cotton harvester for use in a field with parallel rows of cotton, comprising:
 a fore-and-aft extending main frame supported for movement across the field by pairs of frame carrying wheels, at least one pair of said wheels being adapted for rotation about a common axis;
 first and second cotton harvesting units supported at a forward end of said frame, each cotton harvesting unit including forward and rear picker rotors and defining a fore-and-aft plant passage for receiving one of the rows of cotton; and
 means for supporting said cotton harvesting units forwardly of and for vertical movement relative to said frame, said supporting means arranging said harvesting units in an adjacent relationship relative to each other at different distances from the common axis of said wheels such that the picker rotors of said first cotton harvesting unit are offset in a fore-and-aft direction relative to the picker rotors of said second cotton harvesting unit to facilitate nesting of the cotton harvesting units and thereby improve operability of the cotton harvester in harvesting narrow row cotton.

2. The narrow row cotton harvester according to claim 1 wherein said supporting means includes lift arms pivotally connected to said main frame in a manner allowing for relative vertical movement of said cotton harvesting units with respect to said frame.

3. The narrow row cotton harvester according to claim 1 wherein the forward and rear picker rotors of said first cotton harvesting unit each rotates in an orbit on opposite sides of said fore-and-aft plant passage, the forward and rear picker rotors of said second cotton harvesting unit each rotates in an orbit, and wherein a line extending generally parallel to the fore-and-aft plant passage of said second cotton harvesting unit and tangent with the orbit of the rear picker rotor of said second cotton harvesting unit intersects the orbit of said forward picker rotor of said first cotton harvesting unit.

4. The narrow row cotton harvester according to claim 1 wherein the forward and rear picker rotors of said first cotton harvesting unit each rotates in an orbit on opposite sides of said fore-and-aft plant passage, the fore-and-aft plant passage of said second cotton harvesting unit extending substantially parallel to the fore-and-aft plant passage of said first cotton harvesting unit, and wherein the forward and rear picker rotors of said second cotton harvesting unit each rotates in an obit on opposite sides of the fore-and-aft plant passage of said second cotton harvesting unit and a line extending generally parallel to the fore-and-aft plant passages and tangent with the obit of the picker rotor of the second cotton harvesting unit located between said passages intersects the orbit of the picker rotor of said first cotton harvesting unit located between said plant passages.

5. The narrow row cotton harvester according to claim 1 wherein the forward and rear picker rotors of said first cotton harvesting unit each rotates in an obit on opposite sides of said fore-and-aft plant passage of said first cotton harvesting unit, the forward and rear picker rotors of said second cotton harvesting unit each rotates in an orbit on opposite sides of said fore-and-aft plant passage of said second cotton harvesting unit, and wherein a line extending generally parallel to either fore-and-aft plant passage and tangent with the orbit of the rear picker rotor of either cotton harvesting unit intersects the orbit of the rear picker rotor of the other cotton harvesting unit.

6. A narrow row cotton harvester comprising:
a main frame having at least one pair of spaced wheels adapted for rotation about a common axis;
at least three laterally spaced cotton harvesting units adjacently supported at a forward end of said frame for harvesting adjacent rows of cotton, each cotton harvesting unit defining a plant passage with forward and rearward picker rotors disposed on opposite sides of said plant passage, wherein two of said cotton harvesting units have their picker rotors correspondingly disposed relative to the plant passage and the other cotton harvesting unit has its picker rotors arranged in an inverse order relative to the other two cotton harvesting units; and
means for commonly supporting two of said cotton harvesting units for vertical movement relative to said frame at a first a forward distance from the common axis of said wheels and for supporting the third cotton harvesting unit for vertical movement relative to said frame at a second forward distance from the common axis of said wheels such that the picker rotors of said third cotton harvesting unit are offset in a fore-and-aft direction from the picker rotors of said two of said cotton harvesting units to facilitate nesting of the cotton harvesting units and thereby enhance operability of the cotton harvester in harvesting narrow row cotton.

7. The narrow row cotton harvester according to claim 6 wherein said supporting means includes independent lift arms pivotally connected to said frame for allowing simultaneous vertical movement of two of said cotton harvesting units with respect to said frame and said third cotton harvesting unit.

8. The narrow row cotton harvester according to claim 6 wherein a first lift arm supports one or more cotton harvesting units on said frame at a first forward distance from the common axis of said wheels, and a second lift arm supports the remainder of the cotton harvesting units on said frame at a second forward distance from the common axis of said wheels.

9. The narrow row cotton harvester according to claim 6 wherein each picker rotor of each cotton harvesting unit rotates about a generally vertical axis and the lateral distance between the axis of the picker rotors located between adjacent plant passages is less than one half the lateral spacing between the centerlines of said adjacent passages.

10. A narrow row cotton harvester comprising:
a frame supported on at least one pair of laterally spaced wheels, said wheels being adapted for rotation about a common axis;
two inner cotton harvesting units commonly supported forwardly of said frame, each inner cotton harvesting unit defining a plant passage with forward and rear picker rotors disposed on opposite sides of said plant passage;
two outer cotton harvesting units commonly supported forwardly of said frame, each outer harvesting unit being disposed adjacent an inner cotton harvesting unit and defining a plant passage with forward and rear picker rotors disposed on opposite sides of said plant passage; and
means for supporting said inner and outer cotton harvesting units for relative vertical movement with respect to said frame and such that the picker rotors of said two inner cotton harvesting units are supported closer to said common axis than are the picker rotors of said two outer cotton harvesting units.

11. The narrow row cotton harvester according to claim 10 wherein said picker rotors of each inner cotton harvesting unit each rotates in an orbit about a vertical axis, said picker rotors of each outer cotton harvesting unit each rotates in an orbit about a vertical axis, and wherein a line extending generally parallel with the plant passage of an inner cotton harvesting unit and tangent with the obit of the forward picker unit of the same cotton harvesting unit intersects the orbit of the forward picker rotor of an adjacent outer cotton harvesting unit.

12. The narrow row cotton harvester according to claim 10 wherein said supporting means supports said inner cotton harvesting units on said frame along a common line extending substantially parallel with said common axis of said wheels and in a nested relationship relative to said outer cotton harvesting units.

13. The narrow row cotton harvester according to claim 10 wherein a fifth cotton harvesting unit is supported on said frame between said two inner cotton harvesting units.

14. A narrow row cotton harvester for use in a field with parallel rows of cotton, comprising:
- a main frame having at least one pair of wheels adapted for rotation about a common axis;
- first and second cotton harvesting units supported at a forward end of said frame, each cotton harvesting unit being adapted to receive one of the rows of cotton;
- third and fourth cotton harvesting units supported at a forward end of said frame, each harvesting unit being adapted to receive one of the rows of cotton; and
- means for commonly supporting two of said harvesting units for vertical movement at a first distance from said frame and commonly supporting remaining harvesting units for vertical movement at a second distance from said frame so as to enhance access to the harvesting units while allowing said nesting units to be arranged for narrow row cotton harvesting.

15. A narrow row cotton harvester comprising:
- a frame supported on at least one pair of laterally spaced wheels, said wheels being adapted for rotation about a common axis;
- two inner harvesting units supported forwardly of said frame, each inner harvesting unit defining a plant passage with laterally offset picker rotors disposed on opposite sides of said plant passage;
- two outer harvesting units, each outer harvesting unit being disposed adjacent an inner harvesting unit and defining a plant passage with laterally offset picker rotors disposed on opposite sides of said plant passage;
- means for supporting said inner and outer harvesting units for relative vertical movement with respect to said frame and such that said two inner harvesting units are supported closer to said common axis than are said two outer harvesting units;
- a first drive means for driving said two inner cotton harvesting units; and
- a second drive means independent from said first drive means for driving said two outer cotton harvesting units.

16. The narrow row cotton harvester according to claim 15 wherein said first drive means includes a first drive linkage assembly for those driving harvesting units disposed on one side of said frame and said second drive means includes a second drive linkage assembly for driving those harvesting units disposed on an opposite side of the frame.

* * * * *